US012586801B2

(12) United States Patent
Kamata et al.

(10) Patent No.: US 12,586,801 B2
(45) Date of Patent: Mar. 24, 2026

(54) COMPRESSOR AND COMPRESSOR CONTROL METHOD

(71) Applicant: Panasonic Intellectual Property Management Co., Ltd., Osaka (JP)

(72) Inventors: Tomoya Kamata, Shiga (JP); Shigenori Onuma, Nagano (JP); Yukimune Kani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 526 days.

(21) Appl. No.: 18/333,605

(22) Filed: Jun. 13, 2023

(65) Prior Publication Data

US 2023/0327156 A1　Oct. 12, 2023

Related U.S. Application Data

(63) Continuation of application No. PCT/JP2021/031278, filed on Aug. 26, 2021.

(30) Foreign Application Priority Data

Jan. 7, 2021　(JP) ................................ 2021-001332

(51) Int. Cl.
　　*H01M 8/04858* (2016.01)
　　*H01M 8/04089* (2016.01)
　　　　　　(Continued)

(52) U.S. Cl.
　　CPC ... *H01M 8/04888* (2013.01); *H01M 8/04089* (2013.01); *H01M 8/04567* (2013.01); *H01M 50/46* (2021.01)

(58) Field of Classification Search
　　CPC ......... H01M 8/04865; H01M 8/04873; H01M 8/04888; H01M 8/04089; H01M 8/04544;
　　　　　　　(Continued)

(56) References Cited

U.S. PATENT DOCUMENTS

2019/0173114 A1* 6/2019 Sakai ................ H01M 8/04164
2019/0363386 A1 11/2019 Wakita et al.
2019/0368483 A1 12/2019 Wakita et al.

FOREIGN PATENT DOCUMENTS

JP 　　　5167058 B2　　3/2013
JP 　　2015-117139　　6/2015

OTHER PUBLICATIONS

JP2010086851 English translation. Kesato et al. Japan. Apr. 15, 2010. (Year: 2010).*

(Continued)

*Primary Examiner* — Christopher P Domone
(74) *Attorney, Agent, or Firm* — Rimon P.C.

(57) ABSTRACT

A compressor includes at least one cell that includes an electrolyte membrane, an anode located on one main surface of the electrolyte membrane, and a cathode located on the other main surface of the electrolyte membrane; a metallic anode separator located on the anode; a cathode separator located on the cathode; and a voltage application unit for applying a voltage between the anode and the cathode, wherein the compressor causes, by using the voltage applier to apply a voltage, a proton extracted from an anode fluid supplied to the anode to move to the cathode and generates compressed hydrogen, and the compressor includes a controller for causing the voltage application unit to apply the voltage such that a voltage applied per unit cell is lower than a corrosion potential of the metallic anode separator.

21 Claims, 3 Drawing Sheets

(51) Int. Cl.
    *H01M 8/04537*     (2016.01)
    *H01M 50/46*     (2021.01)

(58) Field of Classification Search
    CPC ......... H01M 8/04552; H01M 8/04567; H01M
                                  8/04992
    See application file for complete search history.

(56)                     References Cited

OTHER PUBLICATIONS

The EPC Office Action dated Sep. 9, 2024 for the related European Patent Application No. 21917526.2.
International Search Report of PCT application No. PCT/JP2021/031278 dated Sep. 21, 2021.

* cited by examiner

COMPRESSOR AND COMPRESSOR CONTROL METHOD

BACKGROUND

1. Technical Field

The present disclosure relates to a compressor and a compressor control method.

2. Description of the Related Art

In recent years, as one of measures against global warming, attention has been given to carbon-free fuel cell vehicles, which run by driving a motor using electric power generated by a fuel cell. To popularize fuel cell vehicles, however, there are problems of building an infrastructure to supply hydrogen gas serving as fuel and installing many hydrogen stations nationwide. In particular, the large size and enormous installation costs of hydrogen purification and compression equipment hinder the nationwide development of hydrogen stations.

Thus, for a future carbon-free hydrogen economy, in addition to hydrogen production, there is a need for technological development of high-density storage and low-volume and low-cost transport or utilization of hydrogen gas. To stably supply hydrogen to the fuel supply infrastructure, various proposals have been made to purify and pressurize high-purity hydrogen gas.

Hydrogen gas used as fuel gas in fuel cell vehicles and the like is generally supplied in a compressed state at a high pressure (for example, tens of megapascals). This high-pressure hydrogen gas can be produced, for example, by compressing a low-pressure hydrogen gas, which is produced with a water electrolyzer from water by an electrochemical reaction, to a high pressure with a mechanical compressor.

For example, Japanese Patent No. 6299027 discloses an electrochemical compressor for electrochemically moving hydrogen contained in a low-pressure hydrogen-containing gas composed mainly of hydrogen through an electrolyte membrane from an anode to a cathode and thereby generating compressed hydrogen at the cathode.

More specifically, a cell of the compressor includes a membrane electrode assembly (hereinafter referred to as a MEA), which includes an electrolyte membrane and an electrode catalyst layer formed on both sides of the electrolyte membrane. An anode power supply component and a cathode power supply component are located on both sides of the MEA.

The compressor also includes an anode separator and a cathode separator for holding the power supply components and the MEA of the cell from both sides. The anode separator has an anode passage such that the low-pressure hydrogen-containing gas flows into the anode power supply component and a low-pressure excess hydrogen-containing gas is discharged from the anode power supply component. The cathode separator has a cathode passage to discharge high-pressure compressed hydrogen from the cathode power supply component to the outside. The low-pressure hydrogen-containing gas may contain impurities. For example, the hydrogen-containing gas may be a hydrogen gas generated by electrolysis of water, a by-product gas generated in a steel factory or the like, or a reformed gas produced by reforming a town gas.

In a compressor with a typical fastened structure, a laminate of a plurality of cells and separators alternately stacked is placed between an anode end plate and a cathode end plate to fix the laminate.

SUMMARY

One non-limiting and exemplary embodiment provides a compressor including an electrolyte membrane with less degradation than before and a compressor control method, for example.

In one general aspect, the techniques disclosed here feature a compressor that includes at least one cell that includes an electrolyte membrane, an anode located on one main surface of the electrolyte membrane, and a cathode located on the other main surface of the electrolyte membrane; a metallic anode separator located on the anode; a cathode separator located on the cathode; and a voltage application unit for applying a voltage between the anode and the cathode, wherein the compressor causes, by using the voltage applier to apply a voltage, a proton extracted from an anode fluid supplied to the anode to move to the cathode and generates compressed hydrogen, and the compressor includes a controller for causing the voltage application unit to apply the voltage such that a voltage applied per unit cell is lower than a corrosion potential of the metallic anode separator.

An electrolyte membrane in a compressor and a compressor control method according to one aspect of the present disclosure can have less degradation than before.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figures 1A, 1B:
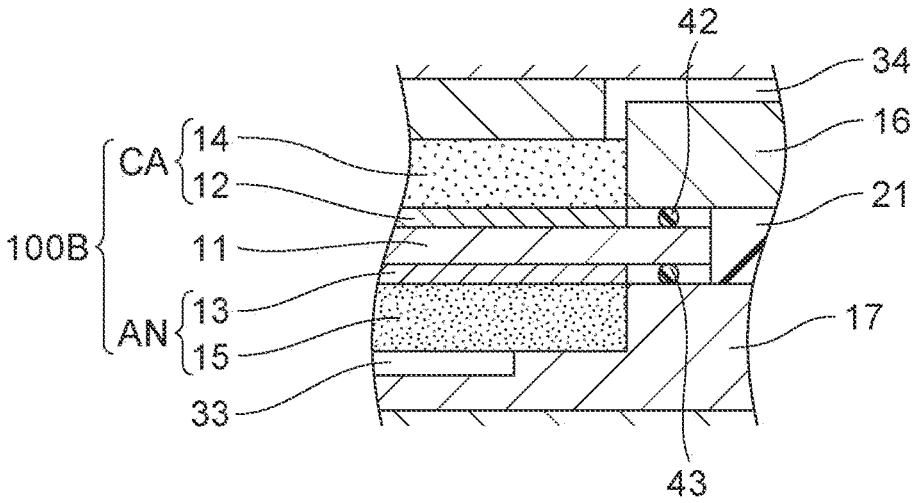
FIG. 1A is a schematic view of an example of an electrochemical hydrogen pump according to a first embodiment.
FIG. 1B is an enlarged view of IB in the electrochemical hydrogen pump of FIG. 1A.

When a voltage is applied between an anode and a cathode in an electrochemical compressor, it is necessary to appropriately control the voltage to reduce the corrosion of a metallic separator. More specifically, when the voltage applied per unit cell of the compressor is equal to or higher than the corrosion potential of a metal in the metallic separator, the cation elution of the metal in the metallic separator caused by the corrosion of the metallic separator may irreversibly decrease the proton conductivity of an electrolyte membrane.

More specifically, a solid polymer membrane (cation-exchange membrane) is typically used as an electrolyte membrane, and the proton conductivity of the electrolyte membrane is proportional to the ion exchange capacity (IEC) in the membrane. Thus, when a cation, such as a metal ion, with strong bonding strength is introduced into an anode fluid, the cation is irreversibly incorporated into an electrolyte membrane and decreases the IEC of the electrolyte membrane. Thus, the introduction of a cation into an anode fluid may decrease the proton conductivity of an electrolyte membrane due to an irreversible decrease in IEC.

Thus, a compressor according to a first aspect of the present disclosure includes at least one cell that includes an electrolyte membrane, an anode located on one main surface of the electrolyte membrane, and a cathode located on the other main surface of the electrolyte membrane; a metallic anode separator located on the anode; a cathode separator located on the cathode; and a voltage application unit for applying a voltage between the anode and the cathode, wherein the compressor causes, by using the voltage applier to apply a voltage, a proton extracted from an anode fluid supplied to the anode to move to the cathode and generates compressed hydrogen, and the compressor includes a controller for causing the voltage application unit to apply the voltage such that a voltage applied per unit cell is lower than a corrosion potential of the metallic anode separator.

An electrolyte membrane in a compressor with such a structure according to the present aspect can have less degradation than before. More specifically, in the compressor according to the present aspect, the applied voltage of the voltage application unit is controlled such that the cell voltage per unit cell is lower than the corrosion potential of the metallic anode separator, and such voltage control reduces the cation elution of a metal in the metallic anode separator due to the corrosion of the metallic anode separator. Thus, the compressor according to the present aspect can appropriately reduce an irreversible decrease in the proton conductivity of the electrolyte membrane.

In a compressor according to a second aspect of the present disclosure, while the controller in the compressor according to the first aspect of the present disclosure causes the voltage application unit to increase the voltage applied to increase an electric current between the anode and the cathode to a target current value, when the voltage applied per unit cell reaches or exceeds the corrosion potential, the controller may cause the voltage application unit to stop the increase in the voltage applied before the electric current between the anode and the cathode reaches the target current value.

When the voltage applied per unit cell reaches or exceeds the corrosion potential before the electric current between the anode and the cathode reaches the target current value, the compressor with such a structure according to the present aspect can stop the increase in the applied voltage of the voltage application unit to retard the corrosion of the metallic anode separator. Thus, the compressor according to the present aspect can maintain or decrease the electric current before the electric current between the anode and the cathode reaches the target current value to continue the hydrogen compression operation of the compressor while reducing the cation elution of a metal in the metallic anode separator.

In a compressor according to a third aspect of the present disclosure, the controller in the compressor according to the first or second aspect may cause the voltage application unit to decrease the voltage applied when the voltage applied per unit cell reaches or exceeds the corrosion potential.

When the voltage applied per unit cell reaches or exceeds the corrosion potential, the compressor with such a structure according to the present aspect can decrease the applied voltage of the voltage application unit to retard the corrosion of the metallic anode separator. Thus, the compressor according to the present aspect can decrease the electric current between the anode and the cathode to continue the hydrogen compression operation of the compressor while further reducing the cation elution of a metal in the metallic anode separator, as compared with the case in which the electric current between the anode and the cathode is maintained.

In a compressor according to a fourth aspect of the present disclosure, the controller in the compressor according to the third aspect may cause the voltage application unit to stop the voltage application when the voltage applied per unit cell is equal to or higher than the corrosion potential even when the voltage applied by the voltage application unit is decreased.

Even when the voltage applied by the voltage application unit is decreased, when the voltage applied per unit cell is equal to or higher than the corrosion potential, the corrosion of the metallic anode separator proceeds. In this case, in the compressor according to the present aspect, the voltage application of the voltage application unit can be stopped to prevent further corrosion of the metallic anode separator.

As described above, a solid polymer membrane is used as an electrolyte membrane, and the solid polymer membrane is not a completely dense membrane. Thus, when the gas composition (for example, the gas concentration of an impurity component) is different between the anode and the cathode arranged with the electrolyte membrane interposed therebetween, the impurity and hydrogen interdiffuse (cross-leakage) through the electrolyte membrane due to a chemical potential difference caused by the gas concentration as a driving force, and the gas composition in the anode and the cathode finally becomes uniform. The cross-leakage gas rate through the electrolyte membrane depends on the material and thickness of the electrolyte membrane.

The electrochemical compressor can electrochemically and selectively move hydrogen from the anode to the cathode through the following reactions in the anode and the cathode and seal the cathode to generate a cathode gas containing compressed hydrogen.

$$\text{Anode: } H_2 \text{ (low pressure)} \rightarrow 2H^+ + 2e^-$$

$$\text{Cathode: } 2H^+ + 2e^- \rightarrow H_2 \text{ (high pressure)}$$

During the rated operation of the compressor, the amount of hydrogen electrochemically and selectively moved from the anode to the cathode is sufficiently larger than the amount of hydrogen moved from the cathode to the anode and the amount of impurity moved from the anode to the cathode due to the cross-leakage. Thus, even if the hydrogen purity of an anode fluid (for example, a hydrogen-containing gas) is lower than a predetermined value, compressed hydrogen generated at the cathode consistently has high hydrogen purity. On the other hand, before the electric current between the anode and the cathode reaches the target current value, which is the current value during rated operation, the amount of hydrogen electrochemically and selectively moved from the anode to the cathode is not necessarily sufficiently larger than the amount of hydrogen moved from the cathode to the anode and the amount of impurity moved from the anode to the cathode due to the cross-leakage. Thus, if the hydrogen purity of an anode fluid is lower than the predetermined value, the hydrogen purity of compressed hydrogen generated at the cathode may be decreased.

Thus, in a compressor according to a fifth aspect of the present disclosure, the compressor according to any one of the first to fourth aspects may include a gas passage for supplying compressed hydrogen to a destination different from a hydrogen consumer and a valve in the gas passage, wherein the controller may cause the valve to open while the controller causes by the voltage application unit to increase the voltage applied to increase the electric current between the anode and the cathode to a target current value.

The compressor with such a structure according to the present aspect can improve the hydrogen purity of compressed hydrogen supplied to a hydrogen consumer, as compared with the case where the valve is closed while the electric current between the anode and the cathode is increased to the target current value. More specifically, before the electric current between the anode and the cathode reaches the target current value, if the hydrogen purity of an anode fluid is lower than a predetermined value, impurity cross-leakage is likely to decrease the chemical potential difference caused by the gas concentration of impurity in the anode and the cathode. In such a case, if the valve is closed while the electric current between the anode and the cathode is increased to the target current value, the hydrogen purity of compressed hydrogen supplied to a hydrogen consumer may be decreased. In the compressor according to the present aspect, however, before the electric current between the anode and the cathode reaches the target current value, the valve can be opened to supply compressed hydrogen containing an impurity to a destination different from a hydrogen consumer. Thus, the compressor according to the present aspect can reduce the decrease in the hydrogen purity of compressed hydrogen supplied to a hydrogen consumer, as compared with the case where the valve is closed while the electric current between the anode and the cathode is increased to the target current value. The valve is not necessarily opened during the entire period before the electric current between the anode and the cathode reaches the target current value. More specifically, the valve only needs to be opened during at least part of the period before the electric current between the anode and the cathode reaches the target current value.

In a compressor according to a sixth aspect of the present disclosure, the controller in the compressor according to the fifth aspect may causes the valve to close when the electric current between the anode and the cathode reaches or exceeds the target current value.

When the electric current between the anode and the cathode is equal to or higher than the target current value, the amount of hydrogen electrochemically and selectively moved from the anode to the cathode is sufficiently larger than the amount of hydrogen moved from the cathode to the anode and the amount of impurity moved from the anode to the cathode due to the cross-leakage. Thus, even if the hydrogen purity of an anode fluid is lower than a predetermined value, compressed hydrogen generated at the cathode consistently has high hydrogen purity. Thus, when the electric current between the anode and the cathode is equal to or higher than the target current value, the compressor according to the present aspect can close the valve to decrease the feed rate of compressed hydrogen to a destination different from a hydrogen consumer, as compared with the case where the valve is not closed when the electric current between the anode and the cathode is equal to or higher than the target current value. Consequently, the compressor according to the present aspect can reduce the decrease in efficiency of the hydrogen compression operation.

Thus, in a compressor according to a seventh aspect of the present disclosure, the compressor according to any one of the first to fourth aspects may include a gas passage for supplying compressed hydrogen to a destination different from a hydrogen consumer and a valve in the gas passage, wherein the controller may cause the valve to close while the controller causes the voltage application unit to increase the voltage applied to increase the electric current between the anode and the cathode to a target current value.

Before the electric current between the anode and the cathode reaches the target current value, if the hydrogen purity of an anode fluid is equal to or greater than a predetermined value, the chemical potential difference caused by the gas concentration of impurity in the anode and the cathode is small, and impurity cross-leakage has a small influence. Thus, compressed hydrogen generated at the cathode consistently has high hydrogen purity. Thus, before the electric current between the anode and the cathode reaches the target current value, the compressor according to the present aspect can close the valve to decrease the feed rate of compressed hydrogen to a destination different from a hydrogen consumer, as compared with the case where the valve is not closed. Consequently, the compressor according to the present aspect can reduce the decrease in efficiency of the hydrogen compression operation.

In a compressor according to an eighth aspect of the present disclosure, the metallic anode separator in the compressor according to any one of the first to seventh aspects may contain a material with hydrogen embrittlement resistance.

In a compressor according to a ninth aspect of the present disclosure, the metallic anode separator in the compressor according to the eighth aspect may contain Ti.

In a compressor according to a tenth aspect of the present disclosure, the metallic anode separator in the compressor according to the eighth aspect may contain SUS316 or SUS316L.

Among various types of stainless steel, SUS316 and SUS316L have high cost performance and good characteristics in terms of corrosion resistance and hydrogen embrittlement resistance. Thus, in the compressor according to the present aspect, the metallic anode separator containing SUS316 or SUS316L can have a lower cost while appropriately maintaining the performance of the compressor.

In a compressor according to an eleventh aspect of the present disclosure, the metallic anode separator in the compressor according to the eighth aspect may contain 4401-316-00-I or 4436-316-00-I, or 4404-316-03-I, 4432-316-03-I, or 4436-316-91-I.

SUS316 according to Japanese Industrial Standards (JIS) corresponds to 4401-316-00-I or 4436-316-00-I according to International Standard (ISO) 15510. SUS316L according to Japanese Industrial Standards corresponds to 4404-316-03-I, 4432-316-03-I, or 4436-316-91-I according to ISO 15510.

In a compressor according to a twelfth aspect of the present disclosure, the metallic anode separator in the compressor according to the eighth aspect may contain 1.4401 or 1.4436, or 1.4404, 1.4432, or 1.4435.

SUS316 according to Japanese Industrial Standards (JIS) corresponds to 1.4401 or 1.4436 according to European Standards (EN). SUS316L according to Japanese Industrial Standards corresponds to 1.4404, 1.4432, or 1.4435 according to European Standards.

In a compressor according to a thirteenth aspect of the present disclosure, the metallic anode separator in the compressor according to the eighth aspect may contain S31600 or S31603.

SUS316 according to Japanese Industrial Standards (JIS) corresponds to S31600 according to American Standards (UNS). SUS316L according to Japanese Industrial Standards corresponds to S31603 according to American Standards.

In a compressor according to a fourteenth aspect of the present disclosure, the metallic anode separator in the compressor according to the eighth aspect may contain S31608 or S31603.

SUS316 according to Japanese Industrial Standards (JIS) corresponds to S31608 according to Chinese Standards (GB). SUS316L according to Japanese Industrial Standards corresponds to S31603 according to Chinese Standards.

A method for controlling a compressor according to a fifteenth aspect of the present disclosure includes causing by applying a voltage between an anode and a cathode provided with an electrolyte membrane interposed therebetween, a proton extracted from an anode fluid supplied to the anode to move to the cathode through the electrolyte membrane and generating compressed hydrogen, wherein the voltage applied between the anode and the cathode is controlled such that a voltage applied per unit cell including the anode and the cathode with the electrolyte membrane interposed therebetween is lower than a corrosion potential of a metallic anode separator located on the anode.

The electrolyte membrane in the compressor control method according to the present aspect can have less degradation than before. The details of the operational advantages of the compressor control method according to the present aspect are the same as the details of the operational advantages of the compressor according to the first aspect and are therefore not described here.

In a method according to a sixteenth aspect of the present disclosure, while the voltage applied between the anode and the cathode is increased to increase an electric current between the anode and the cathode to a target current value, when the voltage applied per unit cell reaches or exceeds the corrosion potential, the increase in the voltage applied between the anode and the cathode in the compressor control method according to the fifteenth aspect may be stopped before the electric current between the anode and the cathode reaches the target current value.

The operational advantages of the compressor control method according to the present aspect are the same as the operational advantages of the compressor according to the second aspect and are therefore not described here.

In a method according to a seventeenth aspect of the present disclosure, the compressor control method according to the fifteenth or sixteenth aspect may further include decreasing the voltage applied between the anode and the cathode when the voltage applied per unit cell reaches or exceeds the corrosion potential.

The operational advantages of the compressor control method according to the present aspect are the same as the operational advantages of the compressor according to the third aspect and are therefore not described here.

In a method according to an eighteenth aspect of the present disclosure, the compressor control method according to the seventeenth aspect may further include stopping the voltage applied between the anode and the cathode when the voltage applied per unit cell is equal to or higher than the corrosion potential even when the voltage applied between the anode and the cathode is decreased.

The operational advantages of the compressor control method according to the present aspect are the same as the operational advantages of the compressor according to the fourth aspect and are therefore not described here.

In a method according to a nineteenth aspect of the present disclosure, the compressor control method according to any one of the fifteenth to eighteenth aspects may further include supplying compressed hydrogen to a destination different from a hydrogen consumer while the voltage applied between the anode and the cathode is increased to increase an electric current between the anode and the cathode to a target current value.

The operational advantages of the compressor control method according to the present aspect are the same as the operational advantages of the compressor according to the fifth aspect and are therefore not described here.

In a method according to a twentieth aspect of the present disclosure, supplying compressed hydrogen to a destination different from a hydrogen consumer in the compressor control method according to the nineteenth aspect may be stopped when the electric current between the anode and the cathode reaches or exceeds the target current value.

The operational advantages of the compressor control method according to the present aspect are the same as the operational advantages of the compressor according to the sixth aspect and are therefore not described here.

In a method according to a twenty-first aspect of the present disclosure, the compressor control method according to any one of the fifteenth to eighteenth aspects may further include stopping the supply of compressed hydrogen to a destination different from a hydrogen consumer while the voltage applied between the anode and the cathode is increased to increase an electric current between the anode and the cathode to a target current value.

The operational advantages of the compressor control method according to the present aspect are the same as the operational advantages of the compressor according to the seventh aspect and are therefore not described here.

Embodiments of the present disclosure are described below with reference to the accompanying drawings. The following embodiments are examples of the above aspects. Thus, numerical values, shapes, materials, constituents, and arrangements and coupling of constituents described below are only examples and do not limit the above aspects unless otherwise specified in the appended claims. Among the constituents described below, constituents not described in the independent claims defining the highest level concepts of the present aspects are described as optional constituents. Those denoted by like reference numerals in the drawings are sometimes not described again. Constituents in the drawings are schematically illustrated for the sake of clarity, and their shapes and dimensions may not be accurate.

First Embodiment

Anode fluids in the compressors described above may be various gases and liquids.

For example, for a compressor of an electrochemical hydrogen pump, the anode fluid may be a hydrogen-containing gas. For example, for a compressor of a water electrolyzer, the anode fluid may be liquid water.

Thus, in the following embodiments, the structure and operation of an electrochemical hydrogen pump as an example of the compressor of each aspect are described on the assumption that the anode fluid is a hydrogen-containing gas.

[System Configuration]

Figures 2A, 2B:
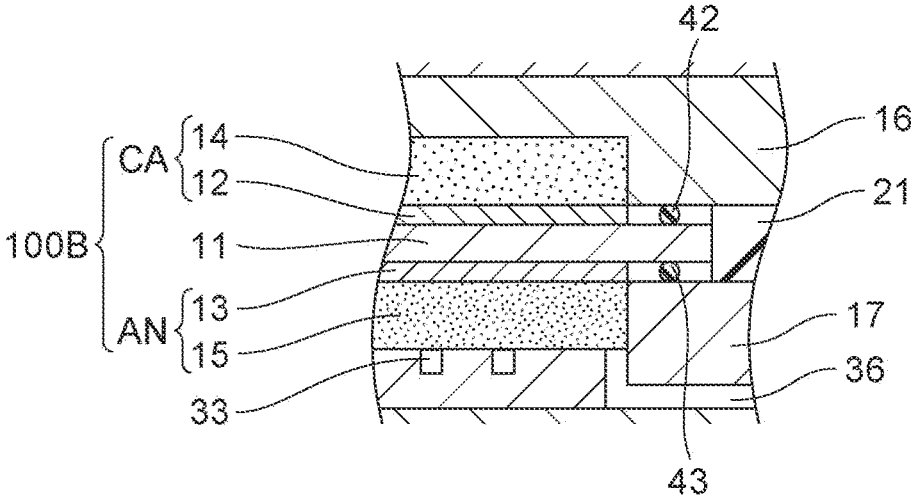
FIG. 2A is a schematic view of an example of the electrochemical hydrogen pump according to the first embodiment.
FIG. 2B is an enlarged view of IIB in the electrochemical hydrogen pump of FIG. 2A.

FIGS. 1A and 2A are schematic views of an example of an electrochemical hydrogen pump according to a first embodiment. FIG. 1B is an enlarged view of IB in the electrochemical hydrogen pump of FIG. 1A. FIG. 2B is an enlarged view of IIB in the electrochemical hydrogen pump of FIG. 2A.

FIG. 1A illustrates a vertical cross section of an electrochemical hydrogen pump 100 including a straight line passing through the center of the electrochemical hydrogen pump 100 and the center of a cathode gas outlet manifold 28 when viewed from the top. FIG. 2A illustrates a vertical cross section of the electrochemical hydrogen pump 100 including a straight line passing through the center of the electrochemical hydrogen pump 100, the center of an anode gas inlet manifold 27, and the center of an anode gas outlet manifold 30 when viewed from the top.

The electrochemical hydrogen pump 100 according to the present embodiment includes at least one electrochemical cell 100B. As illustrated in FIGS. 1B and 2B, the electrochemical cell 100B includes an electrolyte membrane 11, an anode AN, and a cathode CA, and a hydrogen pump unit 100A includes the electrolyte membrane 11, an anode catalyst layer 13, a cathode catalyst layer 12, an anode gas diffusion layer 15, a cathode gas diffusion layer 14, a metallic anode separator 17, and a cathode separator 16.

Although three hydrogen pump units 100A are stacked in the electrochemical hydrogen pump 100, the number of the hydrogen pump units 100A is not limited to three. More specifically, the number of hydrogen pump units 100A can be appropriately determined on the basis of the operating conditions, such as the amount of hydrogen to be compressed by the electrochemical hydrogen pump 100.

The anode AN is located on one main surface of the electrolyte membrane 11. The anode AN is an electrode that includes the anode catalyst layer 13 and the anode gas diffusion layer 15. When viewed from the top, the anode catalyst layer 13 is surrounded with a circular sealing member 43, and the anode catalyst layer 13 is appropriately sealed with the sealing member 43.

The cathode CA is located on the other main surface of the electrolyte membrane 11. The cathode CA is an electrode that includes the cathode catalyst layer 12 and the cathode gas diffusion layer 14. When viewed from the top, the cathode catalyst layer 12 is surrounded with a circular sealing member 42, and the cathode catalyst layer 12 is appropriately sealed with the sealing member 42.

Thus, the electrolyte membrane 11 in contact with the anode catalyst layer 13 and the cathode catalyst layer 12 is held between the anode AN and the cathode CA.

The electrolyte membrane 11 may have any structure that has proton conductivity. For example, the electrolyte membrane 11 may be a fluorinated polymer electrolyte membrane modified with sulfonic acid or a hydrocarbon electrolyte membrane. More specifically, the electrolyte membrane 11 is, but not limited to, Nafion (registered trademark, manufactured by Du Pont) or Aciplex (registered trademark, manufactured by Asahi Kasei Corporation), for example.

The anode catalyst layer 13 is located on one main surface of the electrolyte membrane 11. The anode catalyst layer 13 contains carbon on which a catalytic metal (for example, platinum) can be dispersed, but is not limited to this.

The cathode catalyst layer 12 is located on the other main surface of the electrolyte membrane 11. The cathode catalyst layer 12 contains carbon on which a catalytic metal (for example, platinum) can be dispersed, but is not limited to this.

A catalyst in the cathode catalyst layer 12 and the anode catalyst layer 13 may be prepared by any method. For example, a powder of graphite, carbon black, electrically conductive activated carbon, or the like may be mentioned as a carbon powder. Platinum or another catalytic metal may be supported on a carbon carrier by any method. For example, a method such as powder mixing or liquid phase mixing may be used. For example, the latter liquid phase mixing may be a method of dispersing a carrier, such as carbon, in a colloidal liquid of a catalyst component and allowing the catalyst component to be adsorbed on the carrier. A catalytic metal, such as platinum, may be supported in any state on a carbon carrier. For example, a catalytic metal may be micronized and supported on a carrier in a high dispersion state.

The cathode gas diffusion layer 14 is located on the cathode catalyst layer 12. The cathode gas diffusion layer is composed of a porous material and has electrical conductivity and gas diffusivity. The cathode gas diffusion layer desirably has elasticity to follow the displacement or deformation of the constituent caused by the differential pressure between the cathode CA and the anode AN during the operation of the electrochemical hydrogen pump 100. A base material of the cathode gas diffusion layer 14 may be, but is not limited to, a carbon fiber sintered body or the like, for example.

The anode gas diffusion layer 15 is located on the anode catalyst layer 13. The anode gas diffusion layer 15 is composed of a porous material and has electrical conductivity and gas diffusivity. The anode gas diffusion layer 15 is desirably rigid to withstand the pressing of the electrolyte membrane 11 caused by the differential pressure during the operation of the electrochemical hydrogen pump 100. A base material of the anode gas diffusion layer 15 is, but not limited to, a carbon particle sintered body, for example.

The metallic anode separator 17 is located on the anode gas diffusion layer 15 of the anode AN. The cathode separator 16 is located on the cathode gas diffusion layer 14 of the cathode CA.

Each of the cathode separator 16 and the metallic anode separator 17 has a recessed portion at the center thereof. The cathode gas diffusion layer 14 and the anode gas diffusion layer 15 are located within these recessed portions.

In this manner, the cathode separator 16, the metallic anode separator 17, and the electrochemical cell 100B located therebetween constitute the hydrogen pump unit 100A.

The cathode separator 16 and the metallic anode separator 17 contain a material with hydrogen embrittlement resistance. For example, the cathode separator 16 and the metallic anode separator 17 contain titanium (Ti), stainless steel, or the like.

Among various types of stainless steel, SUS316 and SUS316L have high cost performance and good characteristics in terms of corrosion resistance and hydrogen embrittlement resistance. Because the cathode separator 16 and the metallic anode separator 17 of the electrochemical hydrogen pump 100 according to the present embodiment contain SUS316 or SUS316L, it is possible to reduce the cost of the cathode separator 16 and the metallic anode separator 17 while appropriately maintaining the performance of the electrochemical hydrogen pump 100.

The main surface of the cathode separator 16 in contact with the cathode gas diffusion layer 14 is a plane without a cathode gas passage. This can increase the contact area between the cathode gas diffusion layer 14 and the cathode separator 16, as compared with the case where the cathode gas passage is formed on the main surface of the cathode separator 16. Thus, the electrochemical hydrogen pump 100 can have a lower contact resistance between the cathode gas diffusion layer 14 and the cathode separator 16.

On the other hand, when viewed from the top, for example, a serpentine anode gas passage 33 including a plurality of U-shaped folded portions and a plurality of linear portions is located on the main surface of the metallic anode separator 17 in contact with the anode gas diffusion layer 15. The linear portions of the anode gas passage 33 extend perpendicularly to the drawing in FIG. 2A. The anode gas passage 33 is an example, to which the present disclosure is not limited. For example, the anode gas passage may be composed of a plurality of linear passages.

A circular and flat insulator 21 surrounding the electrochemical cell 100B is located between the cathode separator 16 and the metallic anode separator 17. This prevents a short circuit between the cathode separator 16 and the metallic anode separator 17.

The electrochemical hydrogen pump 100 includes a first end plate and a second end plate at the ends in the stacking direction of the hydrogen pump units 100A, and a fastener 25 for fastening the hydrogen pump units 100A, the first end plate, and the second end plate in the stacking direction.

In the embodiments illustrated in FIGS. 1A and 2A, a cathode end plate 24C and an anode end plate 24A correspond to the first end plate and the second end plate, respectively. More specifically, the anode end plate 24A is an end plate on the metallic anode separator 17 located at one end in the stacking direction of the components of the hydrogen pump unit 100A. The cathode end plate 24C is an end plate on the cathode separator 16 located at the other end in the stacking direction of the components of the hydrogen pump unit 100A.

The fastener 25 may have any structure that can fasten the hydrogen pump units 100A, the cathode end plate 24C, and the anode end plate 24A in the stacking direction. For example, the fastener 25 is a bolt and a nut with a conical spring washer.

As illustrated in FIG. 1A, the cathode gas outlet manifold 28 is composed of through-holes formed in the components of the three hydrogen pump units 100A and in the cathode end plate 24C and a closed-end hole formed in the anode end plate 24A. The cathode end plate 24C has a cathode gas outlet line 26. The cathode gas outlet line 26 may be composed of a pipe through which a cathode off-gas discharged from the cathode CA flows. The cathode gas outlet line 26 communicates with the cathode gas outlet manifold 28.

Furthermore, the cathode gas outlet manifold 28 communicates with the cathode CA of each hydrogen pump unit 100A via a cathode gas flow path 34. Thus, compressed hydrogen generated at the cathode CA of each hydrogen pump unit 100A passes through the cathode gas flow path 34 and then joins together at the cathode gas outlet manifold 28. The combined compressed hydrogen is introduced into the cathode gas outlet line 26.

In this manner, the cathodes CA of the hydrogen pump units 100A communicate with each other through the cathode gas flow path 34 of each hydrogen pump unit 100A and the cathode gas outlet manifold 28.

When viewed from the top, a circular sealing member 40, such as an O-ring, surrounds and appropriately seals the cathode gas outlet manifold 28 between the cathode separator 16 and the metallic anode separator 17, between the cathode separator 16 and a cathode feed plate 22C, and between the metallic anode separator 17 and an anode feed plate 22A.

As illustrated in FIG. 2A, the anode end plate 24A is provided with an anode gas inlet line 29. The anode gas inlet line 29 may be a pipe through which a hydrogen-containing gas to be supplied to the anode AN flows. The anode gas inlet line 29 communicates with the anode gas inlet manifold 27 of a cylindrical shape. The anode gas inlet manifold 27 is composed of through-holes formed in the components of the three hydrogen pump units 100A and in the anode end plate 24A.

The anode gas inlet manifold 27 communicates with one end portion of the anode gas passage 33 of each hydrogen pump unit 100A via a first anode gas flow path 35. Thus, a hydrogen-containing gas supplied to the anode gas inlet manifold 27 through the anode gas inlet line 29 is distributed to each hydrogen pump unit 100A through the first anode gas flow path 35 of the hydrogen pump unit 100A. While the distributed hydrogen-containing gas passes through the anode gas passage 33, the hydrogen-containing gas is supplied to the anode catalyst layer 13 through the anode gas diffusion layer 15.

As illustrated in FIG. 2A, the anode end plate 24A is provided with an anode gas outlet line 31. The anode gas outlet line 31 may be a pipe through which a hydrogen-containing gas discharged from the anode AN flows. The anode gas outlet line 31 communicates with the anode gas outlet manifold 30 of a cylindrical shape. The anode gas outlet manifold 30 is composed of through-holes formed in the components of the three hydrogen pump units 100A and in the anode end plate 24A.

The anode gas outlet manifold 30 communicates with the other end portion of the anode gas passage 33 of each hydrogen pump unit 100A via a second anode gas flow path 36. Thus, hydrogen-containing gases passing through the anode gas passages 33 of the hydrogen pump units 100A are supplied to and combined in the anode gas outlet manifold 30 through the second anode gas flow paths 36. The combined hydrogen-containing gas is introduced into the anode gas outlet line 31.

When viewed from the top, the circular sealing member 40, such as an O-ring, surrounds and appropriately seals the anode gas inlet manifold 27 and the anode gas outlet manifold 30 between the cathode separator 16 and the metallic anode separator 17, between the cathode separator 16 and the cathode feed plate 22C, and between the metallic anode separator 17 and the anode feed plate 22A.

As illustrated in FIGS. 1A and 2A, the electrochemical hydrogen pump 100 includes a voltage application unit 102.

The voltage application unit 102 is an apparatus for applying a voltage between the anode AN and the cathode CA. More specifically, a high electric potential of the voltage application unit 102 is applied to the anode AN, and a low electric potential of the voltage application unit 102 is applied to the cathode CA. The voltage application unit 102 may have any structure that can apply a voltage between the anode AN and the cathode CA. For example, the voltage application unit 102 may be an apparatus that regulates the voltage applied between the anode AN and the cathode CA. In such a case, the voltage application unit 102 includes a DC/DC converter when coupled to a direct-current power supply, such as a battery, a solar cell, or a fuel cell, or includes an AC/DC converter when coupled to an alternating-current power supply, such as a commercial power supply.

The voltage application unit 102 may also be an electric power type power supply in which the voltage between the anode AN and the cathode CA and the electric current between the anode AN and the cathode CA are adjusted to supply a predetermined electric power to the hydrogen pump unit 100A.

In the embodiments illustrated in FIGS. 1A and 2A, a low-voltage terminal of the voltage application unit 102 is coupled to the cathode feed plate 22C, and a high-voltage terminal of the voltage application unit 102 is coupled to the anode feed plate 22A. The cathode feed plate 22C is electrically connected to the cathode separator 16 located at the other end in the stacking direction and faces the cathode end plate 24C with a cathode insulating plate 23C interposed therebetween. The anode feed plate 22A is electrically connected to the metallic anode separator 17 located at one end in the stacking direction and faces the anode end plate 24A with an anode insulating plate 23A interposed therebetween.

Thus, the electrochemical hydrogen pump 100 is an apparatus in which the voltage application unit 102 applies a voltage between the anode AN and the cathode CA to move a proton extracted from a hydrogen-containing gas supplied to the anode AN to the cathode CA and generate compressed hydrogen.

The structure of the electrochemical hydrogen pump 100 described above is an example, to which the present disclosure is not limited. For example, the electrochemical hydrogen pump 100 may have a dead end structure in which hydrogen (H$_2$) in a hydrogen-containing gas supplied to the anode AN through the anode gas inlet manifold 27 is totally compressed by the cathode CA without the anode gas outlet manifold 30 or the anode gas outlet line 31.

A controller 50 controls the applied voltage of the voltage application unit 102 such that the voltage applied per unit cell is lower than the corrosion potential of the metallic anode separator 17. The controller 50 may control the overall operation of the electrochemical hydrogen pump 100. The phrase "per unit cell", as used herein, refers to per electrochemical cell 100B in the examples illustrated in FIGS. 1A and 2A. The phrase "the corrosion potential of the metallic anode separator 17", as used herein, refers to the corrosion potential of a metal contained in the metallic anode separator 17.

The controller 50 includes, for example, an arithmetic circuit (not shown) and a memory circuit for storing a control program (not shown). The arithmetic circuit is MPU or CPU, for example. The memory circuit is a memory, for example. The controller 50 may be composed of a single controller for centralized control or a plurality of controllers for cooperative distributed control.

[Operation]

An example of the operation of the electrochemical hydrogen pump 100 is described below with reference to the accompanying drawings. The following operation may be performed, for example, by an arithmetic circuit of the controller 50 reading a control program from a memory circuit of the controller 50. The following operation is not necessarily performed with the controller 50. An operator may perform part of the operation. In the following example, the controller 50 controls the operation.

First, when the electrochemical hydrogen pump 100 is started, a low-pressure high-humidity hydrogen-containing gas is supplied to the anode AN, and the voltage of the voltage application unit 102 is applied to the electrochemical hydrogen pump 100. A hydrogen molecule is dissociated into a proton and an electron in the anode catalyst layer 13 of the anode AN (formula (1)). The proton is moved to the cathode catalyst layer 12 through the electrolyte membrane 11. The electron is moved to the cathode catalyst layer 12 through the voltage application unit 102.

A hydrogen molecule is then reproduced in the cathode catalyst layer 12 (formula (2)). It is known that the proton moved from the anode AN to the cathode CA through the electrolyte membrane 11 is accompanied by a given amount of electroosmotic water.

At this time, for example, when compressed hydrogen generated at the cathode CA of the electrochemical hydrogen pump 100 is supplied to a hydrogen consumer (not shown) through the cathode gas outlet line 26, the pressure loss in the cathode gas outlet line 26 can be increased with a back-pressure valve, a regulating valve (not shown), or the like provided in the cathode gas outlet line 26 to generate compressed hydrogen (H$_2$) at the cathode CA. An increase in the pressure loss of the cathode gas outlet line 26 corresponds to a decrease in the opening degree of a back-pressure valve or a regulating valve provided in the cathode gas outlet line 26.

$$\text{Anode: } H_2 \text{ (low pressure)} \rightarrow 2H^+ + 2e^- \tag{1}$$

$$\text{Cathode: } 2H^+ + 2e^- \rightarrow H_2 \text{ (high pressure)} \tag{2}$$

The hydrogen consumer is a hydrogen storage or a fuel cell, for example. The hydrogen storage is a hydrogen tank, for example.

Thus, in the electrochemical hydrogen pump 100, a voltage is applied between the anode AN and the cathode CA provided with the electrolyte membrane 11 interposed therebetween to move a proton extracted from a hydrogen-containing gas supplied to the anode AN to the cathode CA through the electrolyte membrane 11 and perform a hydrogen compression operation to generate compressed hydrogen. The "hydrogen compression operation" includes an operation (starting operation) of increasing the voltage applied by the voltage application unit 102 to increase the electric current between the anode AN and the cathode CA to a target current value and an operation (rated operation) of compressing compressed hydrogen in the cathode CA to a predetermined supply pressure and then supplying the compressed hydrogen to a hydrogen consumer. The "target current value" may be, for example, a current value during the rated operation of the electrochemical hydrogen pump 100. The "predetermined supply pressure" may be, but is not limited to, approximately 40 MPa, approximately 80 MPa, or the like.

In the present embodiment, in the hydrogen compression operation, an operation of controlling the voltage applied between the anode AN and the cathode CA is performed such that the voltage applied per unit cell including the anode AN and the cathode CA provided with the electrolyte membrane 11 interposed therebetween is lower than the corrosion potential of the metallic anode separator 17 provided on the anode AN.

As described above, the electrolyte membrane 11 in the electrochemical hydrogen pump 100 according to the present embodiment and the method for controlling the electrochemical hydrogen pump 100 can have less degradation than before. More specifically, in the electrochemical hydrogen pump 100 according to the present embodiment and the method for controlling the electrochemical hydrogen pump 100, the applied voltage of the voltage application unit 102 is controlled such that the cell voltage per unit cell is lower than the corrosion potential of the metallic anode separator 17, so that the cation elution of a metal in the metallic anode separator 17 caused by the corrosion of the metallic anode separator 17 is reduced as compared with the case where such voltage control is not performed. Thus, the electrochemical hydrogen pump 100 according to the present embodiment and the method for controlling the electrochemical hydrogen pump 100 can appropriately reduce the irreversible decrease in the proton conductivity of the electrolyte membrane 11.

First Example

An electrochemical hydrogen pump 100 according to the present example and a method for controlling the electrochemical hydrogen pump 100 are the same as the first embodiment except for the control of the controller 50 described below.

While the voltage applied by the voltage application unit 102 is increased to increase the electric current between the anode AN and the cathode CA to a target current value, when the voltage applied per unit cell reaches or exceeds the corrosion potential of the metallic anode separator 17, the controller 50 causes the voltage application unit 102 to stop the increase in the voltage applied before the electric current between the anode AN and the cathode CA reaches the target current value.

Thus, in the electrochemical hydrogen pump 100 according to the present example and the method for controlling the electrochemical hydrogen pump 100, when the voltage applied per unit cell reaches or exceeds the corrosion potential of the metallic anode separator 17 before the electric current between the anode AN and the cathode CA reaches the target current value, the increase in the applied voltage of the voltage application unit 102 can be stopped to retard the corrosion of the metallic anode separator 17. Thus, the electrochemical hydrogen pump 100 according to the present example and the method for controlling the electrochemical hydrogen pump 100 can continue the hydrogen compression operation of the electrochemical hydrogen pump 100 while reducing the cation elution of a metal in the metallic anode separator 17 by maintaining or decreasing the electric current before the electric current between the anode AN and the cathode CA reaches the target current value.

Except for these characteristics, the electrochemical hydrogen pump 100 according to the present example and the method for controlling the electrochemical hydrogen pump 100 may be the same as the first embodiment.

Second Example

An electrochemical hydrogen pump 100 according to the present example and a method for controlling the electrochemical hydrogen pump 100 are the same as the first embodiment except for the control of the controller 50 described below.

The controller 50 causes the voltage application unit 102 to decrease the voltage applied when the voltage applied per unit cell reaches or exceeds the corrosion potential of the metallic anode separator 17. Furthermore, the controller 50 causes the voltage application unit 102 to stop the voltage application when the voltage applied per unit cell is equal to or higher than the corrosion potential of the metallic anode separator 17 even when the voltage applied by the voltage application unit 102 is decreased.

Thus, in the electrochemical hydrogen pump 100 according to the present example and the method for controlling the electrochemical hydrogen pump 100, when the voltage applied per unit cell reaches or exceeds the corrosion potential of the metallic anode separator 17, the applied voltage of the voltage application unit 102 can be decreased to retard the corrosion of the metallic anode separator 17. Thus, in the electrochemical hydrogen pump 100 according to the present example and the method for controlling the electrochemical hydrogen pump 100, the electric current between the anode AN and the cathode CA can be decreased to continue the hydrogen compression operation of the electrochemical hydrogen pump 100 while reducing the cation elution of a metal in the metallic anode separator 17, as compared with the case where the electric current between the anode AN and the cathode CA is maintained.

Even when the voltage applied by the voltage application unit 102 is decreased, when the voltage applied per unit cell is equal to or higher than the corrosion potential, the corrosion of the metallic anode separator 17 proceeds. In this case, in the electrochemical hydrogen pump 100 according to the present example and the method for controlling the electrochemical hydrogen pump 100, the voltage application of the voltage application unit 102 can be stopped to prevent further corrosion of the metallic anode separator 17.

Except for these characteristics, the electrochemical hydrogen pump 100 according to the present example and the method for controlling the electrochemical hydrogen pump 100 may be the same as the first embodiment or the first example of the first embodiment.

Second Embodiment

Figure 3:
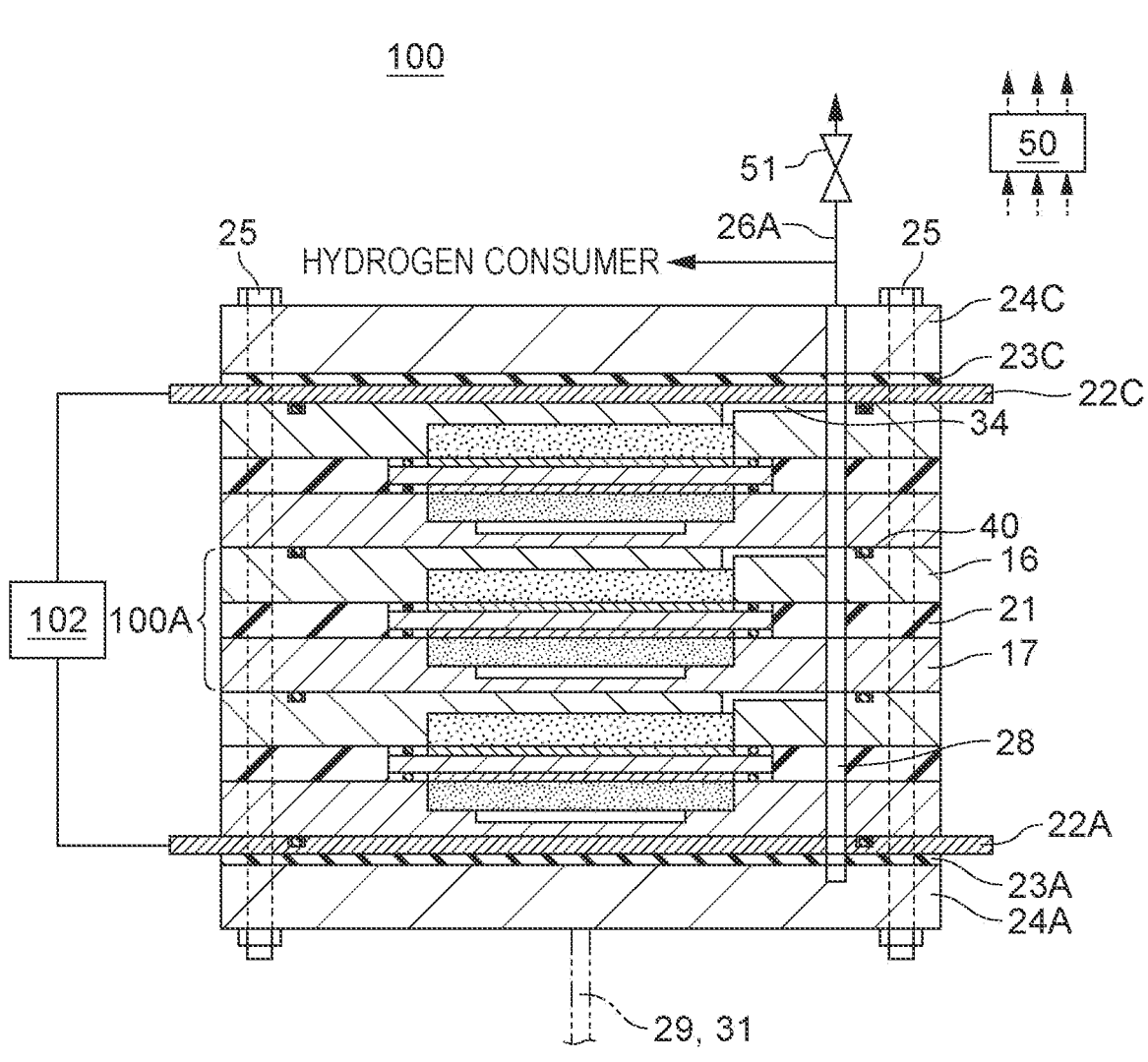
FIG. 3 is a schematic view of an example of an electrochemical hydrogen pump according to a second embodiment.

FIG. 3 illustrates an example of an electrochemical hydrogen pump according to a second embodiment.

In the example illustrated in FIG. 3, an electrochemical hydrogen pump 100 according to the present embodiment is the same as the first embodiment except that a gas passage 26A and a valve 51 are provided. The electrochemical hydrogen pump 100 according to the present embodiment and a method for controlling the electrochemical hydrogen pump 100 are the same as the first embodiment except for the control of the controller 50 described below.

The gas passage 26A is a passage through which compressed hydrogen generated at the cathode CA is supplied to a destination different from a hydrogen consumer. The gas passage 26A may have any structure that can supply such compressed hydrogen to a destination different from a hydrogen consumer.

For example, in the example illustrated in FIG. 3, the gas passage 26A and the gas supply passage for supplying compressed hydrogen generated at the cathode CA to a hydrogen consumer are combined together, and an end portion of a common passage upstream of the combined portion is coupled to the cathode gas outlet manifold 28. Such a passage structure is an example, to which the present disclosure is not limited. An upstream end of the gas passage 26A may be coupled to any portion that communicates with the cathode CA of the electrochemical hydrogen pump 100.

The valve 51 is provided in the gas passage 26A. The valve 51 may have any structure that can open and close the gas passage 26A. For example, the valve 51 may be, but is not limited to, a drive valve driven by nitrogen gas, air, or the like or a solenoid valve. Although not shown, an appropriate valve is also provided in a gas supply passage extending from the combined portion to a hydrogen consumer.

As described above, a solid polymer membrane is used as the electrolyte membrane 11, and the solid polymer membrane is not a completely dense membrane. Thus, when the gas composition (for example, the gas concentration of an impurity component) is different between the anode AN and the cathode CA arranged with the electrolyte membrane 11 interposed therebetween, the impurity and hydrogen inter-diffuse (cross-leakage) through the electrolyte membrane 11 due to a chemical potential difference caused by the gas concentration as a driving force, and the gas composition in the anode AN and the cathode CA finally becomes uniform. The cross-leakage gas rate through the electrolyte membrane 11 depends on the material and thickness of the electrolyte membrane 11.

The electrochemical hydrogen pump 100 can electro-chemically and selectively move hydrogen (proton) from the anode AN to the cathode CA through the reactions in the anode AN and the cathode CA shown in the formulae (1) and (2) and seal the cathode to generate a cathode gas containing compressed hydrogen.

During the rated operation of the electrochemical hydro-gen pump 100, the amount of hydrogen electrochemically and selectively moved from the anode AN to the cathode CA is sufficiently larger than the amount of hydrogen moved from the cathode CA to the anode AN and the amount of impurity moved from the anode AN to the cathode CA due to the cross-leakage. Thus, even if the hydrogen purity of a hydrogen-containing gas of the anode AN is lower than a predetermined value, compressed hydrogen generated at the cathode CA consistently has high hydrogen purity. On the other hand, before the electric current between the anode and the cathode reaches the target current value, which is the current value during rated operation, the amount of hydro-gen electrochemically and selectively moved from the anode AN to the cathode CA is not necessarily sufficiently larger than the amount of hydrogen moved from the cathode CA to the anode AN and the amount of impurity moved from the anode AN to the cathode CA due to the cross-leakage. Thus, if the hydrogen purity of a hydrogen-containing gas of the anode AN is lower than the predetermined value, the hydro-gen purity of compressed hydrogen generated at the cathode CA may be decreased.

Thus, in the present embodiment, the controller 50 causes the valve 51 to open while the voltage applied by the voltage application unit 102 is increased to increase the electric current between the anode AN and the cathode CA to the target current value. At this time, the valve in the gas supply passage extending from the combined portion to a hydrogen consumer is closed.

When the electric current between the anode AN and the cathode CA reaches or exceeds the target current value, the controller 50 causes the valve 51 to close.

Thus, the electrochemical hydrogen pump 100 according to the present embodiment and the method for controlling the electrochemical hydrogen pump 100 can improve the hydrogen purity of compressed hydrogen supplied to a hydrogen consumer, as compared with the case where the valve 51 is closed while the electric current between the anode AN and the cathode CA is increased to the target current value. More specifically, before the electric current between the anode AN and the cathode CA reaches the target current value, if the hydrogen purity of a hydrogen-contain-ing gas of the anode AN is lower than a predetermined value, impurity cross-leakage is likely to decrease the chemical potential difference caused by the gas concentration of impurity in the anode AN and the cathode CA. In this case, if the valve 51 is closed while the electric current between the anode AN and the cathode CA is increased to the target current value, the hydrogen purity of compressed hydrogen supplied to a hydrogen consumer may be decreased. In the electrochemical hydrogen pump 100 according to the pres-ent embodiment and the method for controlling the electrochemical hydrogen pump 100, however, before the electric current between the anode AN and the cathode CA reaches the target current value, the valve 51 can be opened to supply compressed hydrogen containing an impurity to a destina-tion different from a hydrogen consumer. Thus, the electro-chemical hydrogen pump 100 according to the present embodiment and the method for controlling the electro-chemical hydrogen pump 100 can reduce the decrease in the hydrogen purity of compressed hydrogen supplied to a hydrogen consumer, as compared with the case where the valve 51 is closed while the electric current between the anode AN and the cathode CA is increased to the target current value. The valve 51 is not necessarily opened during the entire period before the electric current between the anode AN and the cathode CA reaches the target current value. More specifically, the valve 51 only needs to be opened during at least part of the period before the electric current between the anode AN and the cathode CA reaches the target current value.

When the electric current between the anode AN and the cathode CA reaches or exceeds the target current value, the amount of hydrogen electrochemically and selectively moved from the anode AN to the cathode CA is sufficiently larger than the amount of hydrogen moved from the cathode CA to the anode AN and the amount of impurity moved from the anode AN to the cathode CA due to the cross-leakage. Thus, even if the hydrogen purity of a hydrogen-containing gas of the anode AN is lower than a predetermined value, compressed hydrogen generated at the cathode CA consis-tently has high hydrogen purity. Thus, in the electrochemical hydrogen pump 100 according to the present embodiment and the method for controlling the electrochemical hydrogen pump 100, when the electric current between the anode AN and the cathode CA is equal to or higher than the target current value, the valve 51 can be closed to decrease the feed rate of compressed hydrogen to a destination different from a hydrogen consumer, as compared with the case where the valve 51 is not closed when the electric current between the anode AN and the cathode CA is equal to or higher than the target current value. Consequently, the electrochemical hydrogen pump 100 according to the present embodiment and the method for controlling the electrochemical hydrogen pump 100 can reduce the decrease in efficiency of the hydrogen compression operation.

Except for these characteristics, the electrochemical hydrogen pump 100 according to the present embodiment and the method for controlling the electrochemical hydrogen pump 100 may be the same as the first embodiment or the first or second example of the first embodiment.

Modified Example

An electrochemical hydrogen pump 100 according to the present modified example and a method for controlling the electrochemical hydrogen pump 100 are the same as the second embodiment except for the control of the controller 50 described below.

The controller 50 causes the valve 51 to close while the voltage applied by the voltage application unit 102 is increased to increase the electric current between the anode AN and the cathode CA to the target current value.

Before the electric current between the anode AN and the cathode CA reaches the target current value, if the hydrogen purity of a hydrogen-containing gas of the anode AN is equal to or greater than a predetermined value, the chemical potential difference caused by the gas concentration of impurity in the anode AN and the cathode CA is small, and impurity cross-leakage has a small influence. Thus, compressed hydrogen generated at the cathode CA consistently has high hydrogen purity. Thus, in the electrochemical hydrogen pump 100 according to the present modified example and the method for controlling the electrochemical hydrogen pump 100, before the electric current between the anode AN and the cathode CA reaches the target current value, the valve 51 can be closed to decrease the feed rate of compressed hydrogen to a destination different from a hydrogen consumer, as compared with the case where the valve 51 is not closed. Consequently, the electrochemical hydrogen pump 100 according to the present modified example and the method for controlling the electrochemical hydrogen pump 100 can reduce the decrease in efficiency of the hydrogen compression operation.

Except for these characteristics, the electrochemical hydrogen pump 100 according to the present modified example and the method for controlling the electrochemical hydrogen pump 100 may be the same as the first embodiment, the first or second example of the first embodiment, or the second embodiment.

The first embodiment, the first and second examples of the first embodiment, the second embodiment, and the modified example of the second embodiment may be combined, unless they contradict each other.

Various modifications and other embodiments of the present disclosure are apparent to those skilled in the art from the foregoing description. Thus, the above description should be construed as illustrative only and is provided to teach those skilled in the art the best mode for implementing the present disclosure. The details of the structure and/or function can be substantially changed without departing from the spirit of the present disclosure. For example, the structure and operation of the electrochemical hydrogen pump 100 may be applied to other compressors, such as water electrolyzers.

One aspect of the present disclosure can be applied to a compressor and a compressor control method that can include an electrolyte membrane with less degradation than before.

What is claimed is:

1. A compressor comprising: at least one cell that includes an electrolyte membrane, an anode located on one main surface of the electrolyte membrane, and a cathode located on the other main surface of the electrolyte membrane; a metallic anode separator located on the anode; a cathode separator located on the cathode; and a voltage application unit for applying a voltage between the anode and the cathode, wherein the compressor causes, by using the voltage applier to apply a voltage, a proton extracted from an anode fluid supplied to the anode to move to the cathode and generates compressed hydrogen, and the compressor includes a controller for causing the voltage application unit to apply the voltage such that a voltage applied per unit cell is lower than a corrosion potential of the metallic anode separator.

2. The compressor according to claim 1, wherein while the controller causes the voltage application unit to increase the voltage applied to increase an electric current between the anode and the cathode to a target current value, when the voltage applied per unit cell reaches or exceeds the corrosion potential, the controller causes the voltage application unit to stop the increase in the voltage applied before the electric current between the anode and the cathode reaches the target current value.

3. The compressor according to claim 1, wherein the controller causes the voltage application unit to decrease the voltage applied when the voltage applied per unit cell reaches or exceeds the corrosion potential.

4. The compressor according to claim 3, wherein the controller causes the voltage application unit to stop the voltage application when the voltage applied per unit cell is equal to or higher than the corrosion potential even when the voltage applied by the voltage application unit is decreased.

5. The compressor according to claim 1, further comprising: a gas passage for supplying the compressed hydrogen to a destination different from a hydrogen consumer; and a valve in the gas passage, wherein the controller causes the valve to open while the controller causes the voltage application unit to increase the voltage applied to increase the electric current between the anode and the cathode to a target current value.

6. The compressor according to claim 5, wherein the controller causes the valve to close when the electric current between the anode and the cathode reaches or exceeds the target current value.

7. The compressor according to claim 1, further comprising: a gas passage for supplying the compressed hydrogen to a destination different from a hydrogen consumer; and a valve in the gas passage, wherein the controller causes the valve to close while the controller causes the voltage application unit to increase the voltage applied to increase the electric current between the anode and the cathode to a target current value.

8. The compressor according to claim 1, wherein the metallic anode separator contains a material with hydrogen embrittlement resistance.

9. The compressor according to claim 8, wherein the metallic anode separator contains Ti.

10. The compressor according to claim 8, wherein the metallic anode separator contains SUS316 or SUS316L.

11. The compressor according to claim 8, wherein the metallic anode separator contains 4401-316-00-I or 4436-316-00-I, or 4404-316-03-I, 4432-316-03-I, or 4436-316-91-I.

12. The compressor according to claim 8, wherein the metallic anode separator contains 1.4401 or 1.4436, or 1.4404, 1.4432, or 1.4435.

13. The compressor according to claim 8, wherein the metallic anode separator contains S31600 or S31603.

14. The compressor according to claim 8, wherein the metallic anode separator contains S31608 or S31603.

15. A method for controlling a compressor, comprising causing, by applying a voltage between an anode and a cathode provided with an electrolyte membrane interposed therebetween, a proton extracted from an anode fluid supplied to the anode to move to the cathode through the electrolyte membrane and generating compressed hydrogen, wherein the voltage applied between the anode and the cathode is controlled such that a voltage applied per unit cell including the anode and the cathode with the electrolyte membrane interposed therebetween is lower than a corrosion potential of a metallic anode separator located on the anode.

16. The method according to claim 15, wherein while the voltage applied between the anode and the cathode is increased to increase an electric current between the anode and the cathode to a target current value, when the voltage applied per unit cell reaches or exceeds the corrosion potential, the increase in the voltage applied between the anode and the cathode is stopped before the electric current between the anode and the cathode reaches the target current value.

17. The method according to claim 15, further comprising decreasing the voltage applied between the anode and the cathode when the voltage applied per unit cell reaches or exceeds the corrosion potential.

18. The method according to claim 17, further comprising stopping the voltage applied between the anode and the cathode when the voltage applied per unit cell is equal to or higher than the corrosion potential even when the voltage applied between the anode and the cathode is decreased.

19. The method according to claim 15, further comprising supplying compressed hydrogen to a destination different from a hydrogen consumer while the voltage applied between the anode and the cathode is increased to increase an electric current between the anode and the cathode to a target current value.

20. The method according to claim 19, wherein the supplying compressed hydrogen to a destination different from a hydrogen consumer is stopped when the electric current between the anode and the cathode reaches or exceeds the target current value.

21. The method according to claim 15, further comprising stopping the supply of compressed hydrogen to a destination different from a hydrogen consumer while the voltage applied between the anode and the cathode is increased to increase an electric current between the anode and the cathode to a target current value.

* * * * *